United States Patent [19]
Ater et al.

[11] Patent Number: 5,659,543
[45] Date of Patent: Aug. 19, 1997

[54] COMMUNICATION METHOD AND SYSTEM FOR AGGREGATES OF SEPARATE ENTITIES USING DATA/MANAGEMENT PATH AND MAPPING PATH FOR IDENTIFYING ENTITIES AND MANAGING A COMMUNICATION NETWORK

[75] Inventors: Dan Ater, Newton; Yigal Banker, Chestnut Hill; Kenneth Anthony Giusti, Upton; Richard L. Jacobson, Maynard; Brian Mahan, Ashland, all of Mass.

[73] Assignee: 3COM Corporation, Santa Clara, Calif.

[21] Appl. No.: 392,473

[22] Filed: Feb. 22, 1995

[51] Int. Cl.$^6$ .................................................. H04L 12/42
[52] U.S. Cl. ........................... 370/258; 370/403; 370/410; 370/452; 340/825.05
[58] Field of Search ...................... 370/85.12, 85.15, 370/54, 56, 110.1, 85.14, 95.1, 95.2, 85.7, 85.8, 85.3, 85.5, 85.9, 85.11, 17, 854, 254–258, 434, 435, 441, 442, 445–447, 450–452, 449; 395/200; 340/825.05, 825.06, 825.07, 825.08, 825.54

[56] References Cited

U.S. PATENT DOCUMENTS

| | | | |
|---|---|---|---|
| 4,905,229 | 2/1990 | Kato | 370/400 |
| 5,003,533 | 3/1991 | Watanabe | 370/258 |
| 5,051,987 | 9/1991 | Conlon | 370/255 |
| 5,081,623 | 1/1992 | Ainscow | 370/451 |
| 5,150,464 | 9/1992 | Sidhu et al. | 395/200 |
| 5,291,490 | 3/1994 | Conti et al. | 370/451 |
| 5,301,303 | 4/1994 | Abraham et al. | 370/434 |
| 5,408,610 | 4/1995 | Arakawa | 370/452 |
| 5,420,986 | 5/1995 | Baldwin et al. | 370/452 |
| 5,422,631 | 6/1995 | Gertz | 370/449 |
| 5,432,789 | 7/1995 | Armstrong et al. | 370/254 |
| 5,440,633 | 8/1995 | Augustine et al. | 340/825.07 |
| 5,461,608 | 10/1995 | Yoshiyama | 370/455 |
| 5,483,520 | 1/1996 | Eychenne et al. | 370/222 |
| 5,506,838 | 4/1996 | Flanagan | 370/258 |
| 5,574,860 | 11/1996 | Perlman et al. | 370/254 |

*Primary Examiner*—Alpus H. Hsu
*Assistant Examiner*—Seema S. Rao
*Attorney, Agent, or Firm*—McGlew and Tuttle

[57] ABSTRACT

A system and method for communication and management of an aggregate is provided including a plurality of separate entities, each entity residing in a separate environment. The system includes a data path which is provided as a common medium. Each of the entities is connected to the data path for exciting the medium with a signal. All entities connected to the common medium receive the signal. A mapping path is also provided. The mapping path is implemented as a multitude of point-to-point connections such that each entity is connected directly to another entity via a point-to-point connection or connected to a first entity by a point-to-point connection and connected to a second entity by a point-to-point connection. The connections provide a known topology, allowing identification of all entities adjacent to a given entity to establish mapped adjacent entities. From these mapped adjacent entities all entities adjacent to the mapped adjacent entities are mapped until all entities of the aggregate are mapped.

16 Claims, 12 Drawing Sheets

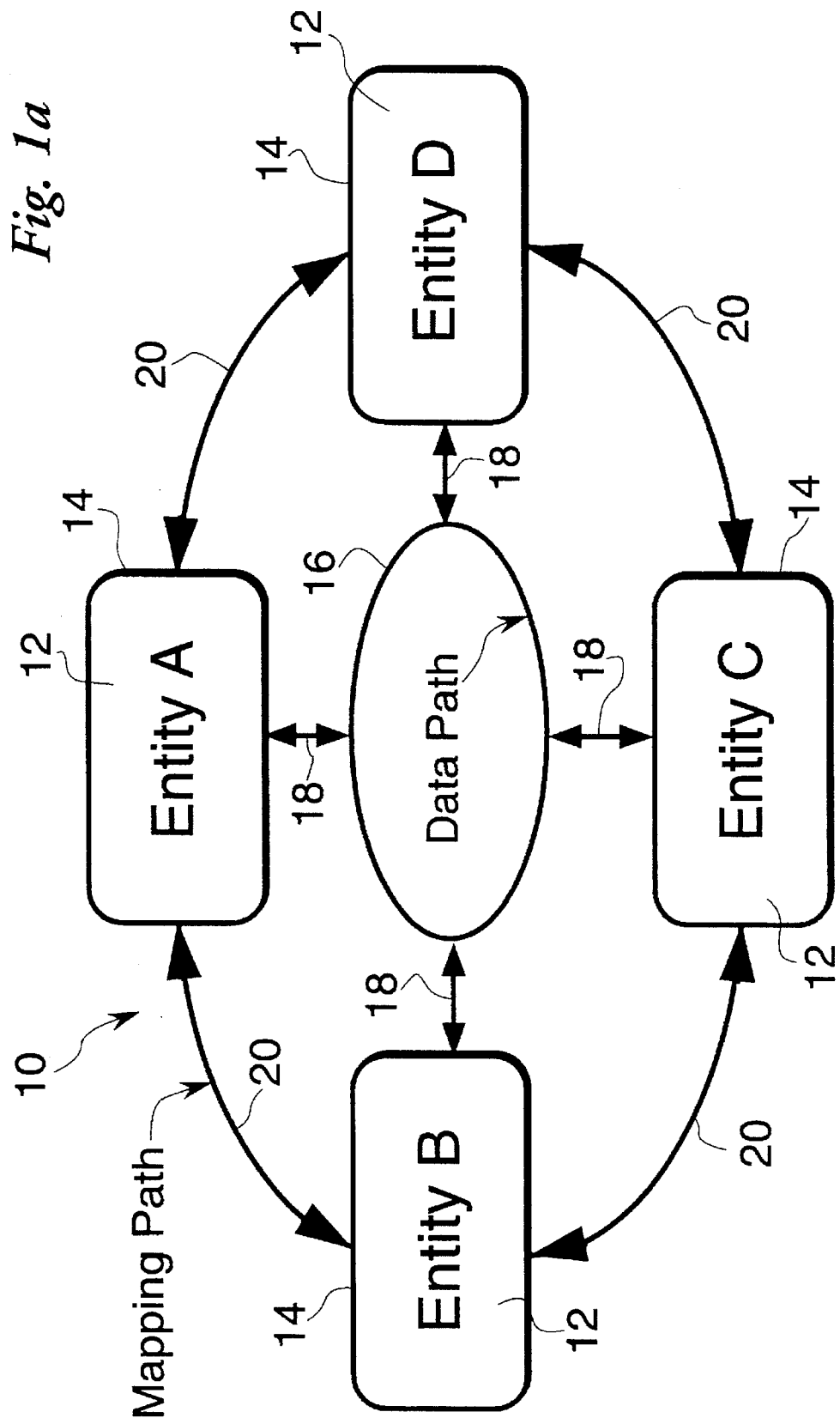

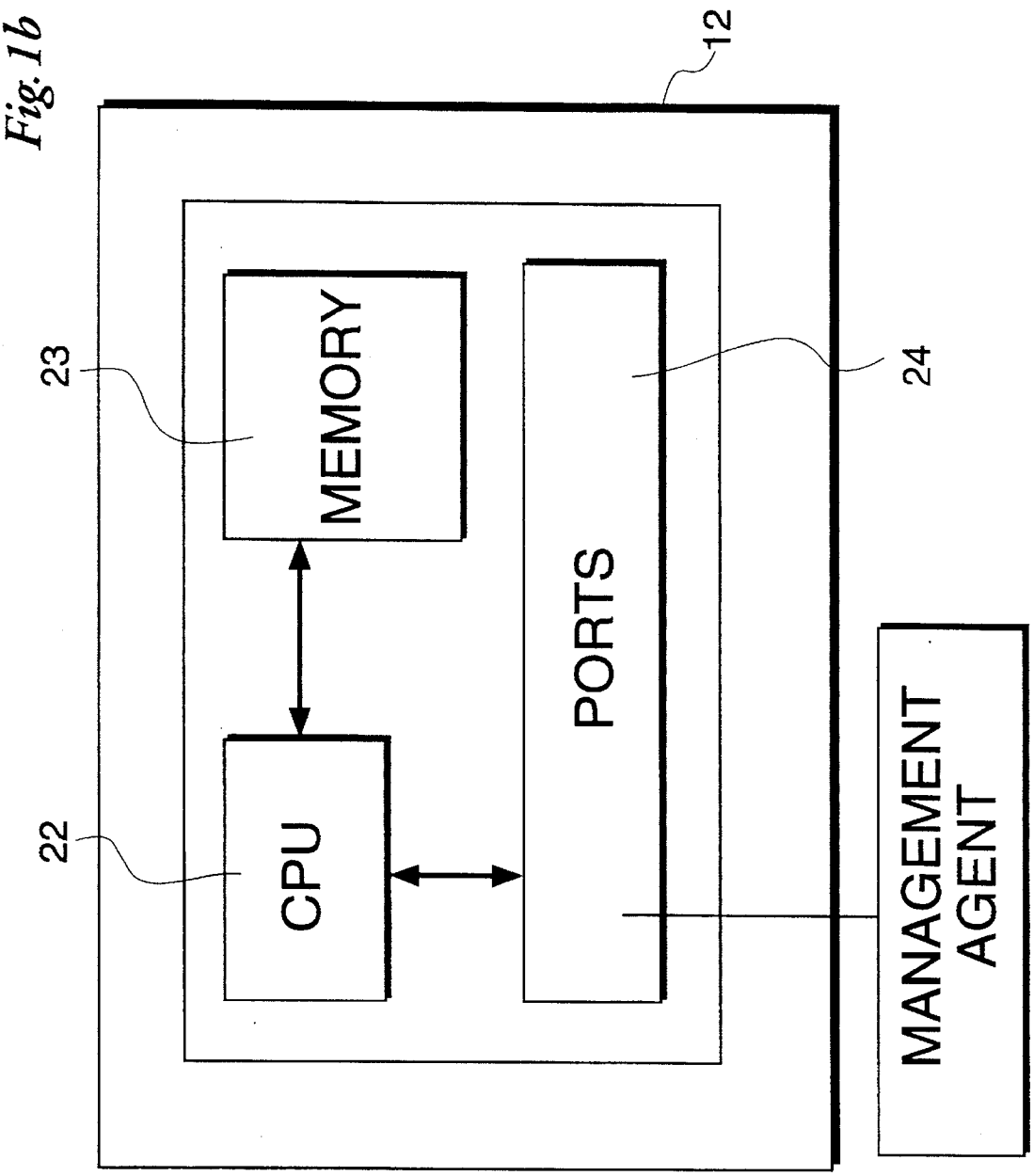

COMMUNICATION METHOD AND SYSTEM FOR AGGREGATES OF SEPARATE ENTITIES USING DATA/MANAGEMENT PATH AND MAPPING PATH FOR IDENTIFYING ENTITIES AND MANAGING A COMMUNICATION NETWORK

FIELD OF THE INVENTION

The invention relates to the field of communications in general and more particularly to communication involving networks such as local area networks, wide area networks and the like wherein entities provide services to one or more users including providing a connection to other entities which are coupled to other users. The entities with which the invention relates reside in separate environments (for example, but not limited to, separate enclosures). The entities may be assembled together in order to implement a unified aggregate which provides a service and the aggregate can communicate with a management agent (human or electro-mechanical) as a whole.

BACKGROUND OF THE INVENTION

It is known in the field of local area networks to provide bridges, routers and hubs and other entities which provide a connective function and provide other functions to users of the network. Hubs typically provide a connection platform whereby various individual users are connected through the hub to users connected to other hubs (for example at other locations or at the same location). It is known in the art to provide hubs (also referred to as concentrators herein) which provide a backplane allowing communication between different users connected to the concentrator. Often, there is a need for an additional concentrator at the same location, typically due to the fact that all of the connection locations of the concentrator have been used. Typically, the hubs are connected in a method which is known as daisy chaining wherein connection ports are used to chain hubs together thereby providing a multiplicity of the connection sites, based on the number of hubs provided. For example, if each hub has eight ports, and the hubs are daisy chained together, at least one port out of 8 is used for daisy chaining. With three hubs daisy chained together, the center hub will house 6 free ports, i.e. 20 total connection ports are provided at the single location wherein 3 hubs are used.

Networks are known wherein a management agent is provided for overseeing the network. The agent manages communications between users connected at points of access. Such management can include setting up one or more networks by either physical or logical connection of points of access and also monitoring the network including monitoring activity such as monitoring collisions and monitoring connections. In situations wherein a plurality of entities are provided in separate environments (such as, but not limited to separate enclosures) and the entities are assembled together or connected together in order to implement a unified aggregate which provides a service, it is still desirable to provide a management agent (human or mechanical) for the aggregate.

SUMMARY AND OBJECTS OF THE INVENTION

It is an object of the invention to provide a communication and management method and system based on entities which reside in separate environments (for example, within separate enclosures) wherein the entities are assembled together in order to implement a unified aggregate which provides a service and wherein the aggregate can communicate with a management agent (human or mechanical) as a whole.

According to the invention, a system for communication and management of an aggregate based on separate entities is provided including a plurality of separate entities, each entity residing in a separate environment. This system includes a data path which is provided as a common medium. Each of the entities is connected to the data path for exciting the medium with a signal. All entities connected to the common medium receive the signal. A mapping path is also provided. The mapping path is implemented as a multitude of point-to-point connections such that each entity is connected directly to another entity via a point-to-point connection or connected to a first entity by a point-to-point connection and connected to a second entity by a point-to-point connection. The connections provide a known topology, allowing identification of all entities adjacent to a given entity to establish mapped adjacent entities and from said mapped adjacent entities to establish all entities adjacent to said mapped adjacent entities until all entities of the aggregate are mapped.

The management agent can be provided as software wherein the management agent is connected to the aggregate via one or more active points of access residing in one or more of the entities. For example, network management software may be present in a computer which is connected to one or more of the entities. The management agent manages communications on the data path including storing necessary data.

The system includes a procedure for providing one of the entities as a coordinating entity, wherein the coordinating entity provides a point of access for the managing agent. Several of the entities may have the ability to provide the point of access to the management agent and each of these entities includes designation means for participating in a process for designating a coordinating entity.

The designation means may be in the form of an intelligent device such as a processor, located in the entity, wherein the algorithm and procedure is followed based on software/hardware present in the entity. The entity may also be somewhat passive and the software or hardware structure (means) for designation is connected to the entity (such as computer units connected to the entity). The provision of means in an entity (both hardware and algorithms implemented in software INSIDE the entity) is preferred. According to this preferred embodiment, the entities in the aggregate are of two kinds:

1) Those which contain software (S/W) and/or hardware (H/W) capable to monitor and manage the aggregate.
2) Those which DO NOT contain S/W and/or H/W capable to monitor and manage the aggregate.

For example, according to the preferred system of the invention, base unit(s) and expansion unit(s) are provided. Only the base units participate in the designation process. The base units are of the kind noted as 1 above. Once one unit is designated it will actively monitor the units in the aggregate, and upon certain conditions take steps to induce changes in the operation and functionality of the other entities in the aggregate.

The designation means listens to the data path medium for a predetermined period of time for detecting communication signals. Upon detecting communication signals, the designation means awaits issuance of a message from the coordinating entity. The message requests that all unmapped entities signal their presence for mapping. If no communication signalling is detected on the data path, the designation means transmits a signal containing unique information identifying itself. If during this transmission of unique information identifying itself additional entities transmit their unique information identifying themselves, the designation means of each of the entities ends their transmission and the designation means of each entity randomly chooses a time period. Upon expiration of the randomly chosen time period, the designation means of each entity will attempt to transmit again its unique information identifying itself. The entity which completes the transmission of the unique information is established as the coordinating entity.

The coordinating entity coordinates all communications on the data path including sending a message addressed to an entity in the aggregate whereby the entity receives the message from the coordinating entity, performs the necessary operations and transmits a message containing information relevant to the received message. With this system, the coordinating entity addresses each entity in the aggregate within a specified and agreed upon time period. The designating means of each entity listens to the data path medium for the predetermined period of time. If it does not detect any communication signals, it can either isolate itself to operate as a stand-alone entity independent of the aggregate, initiate the algorithm for designating the entity as the coordinating entity or it can wait for the coordinating entity to issue a request that all unmapped entities send a message announcing that they are connected to the aggregate.

The mapping path of the system of the invention is independent of the data path which allows two entities in the aggregate to communicate simultaneously, namely along the data path and along the mapping path. The topology of the mapping path is preset or known and this may be, for example, a ring. The topology may be other known topologies, however, the mapping path is preferably based on point-to-point connection, between entities adjacent to each other. For example, a stack of entities may be provided wherein each entity is connected to an entity above it and below it, or in the case of the top entity, the entity is connected by point-to-point connection to the entity immediately below and also to the bottom-most entity (to form a simple ring). A mapping path can also be implemented by multiplexing, including spatial multiplexing or multiplexing based on different frequency ranges.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1a is a schematic representation of the aggregate formed of separate entities according to the invention;

FIG. 1b is a schematic view of elements of an entity which can act as coordinating entity.

DETAILED DESCRIPTION OF THE PREFERRED EMBODIMENT

Figure 2:
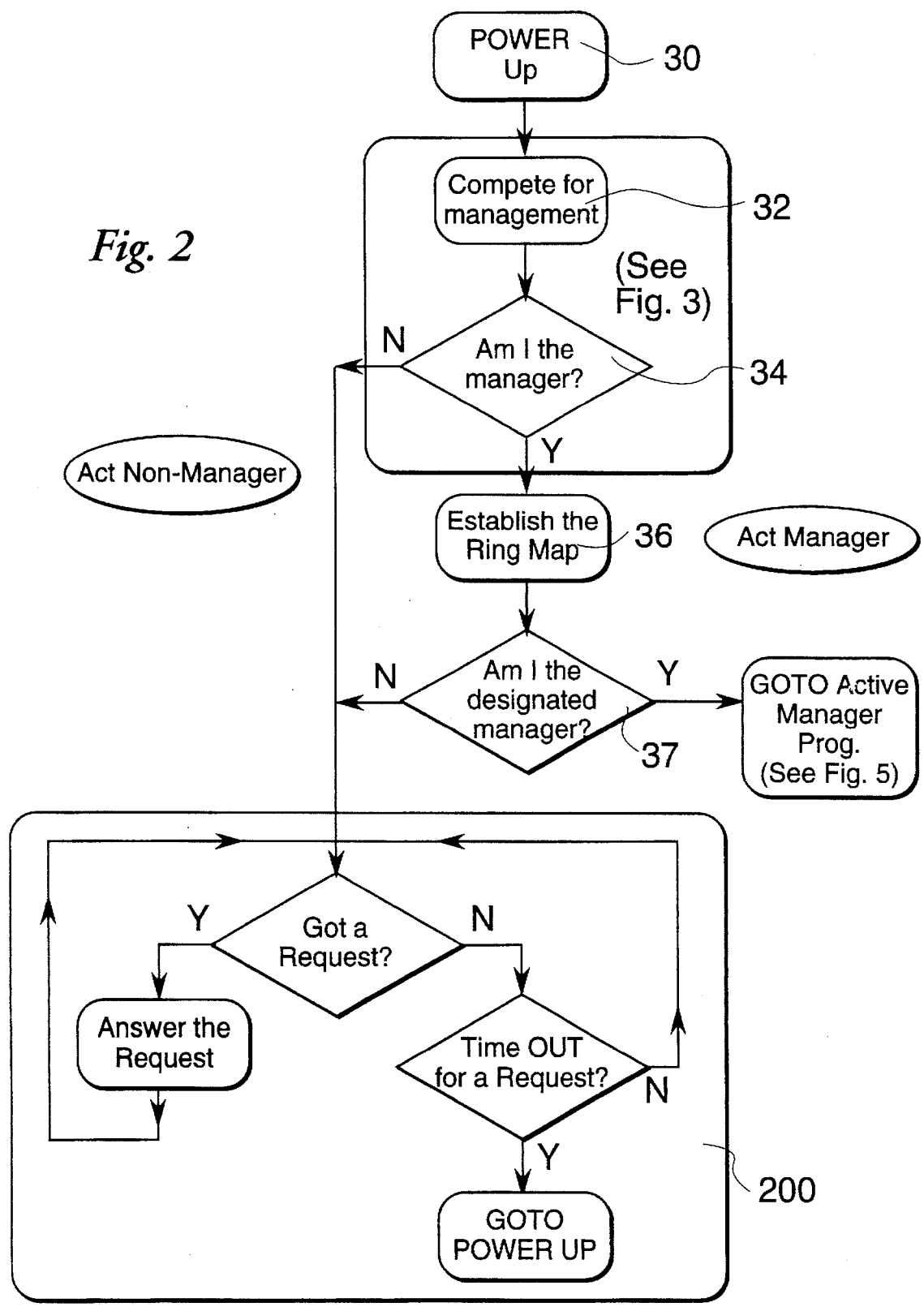
FIG. 2 is a logical flow path describing the situation for entities of the aggregate during power-up and the steady state functionality of the aggregate.

Referring to the drawings in particular, the invention comprises an aggregate generally designated 10. The aggregate is formed of a plurality of separate entities 12. Each of the entities 12 resides in a separate environment. For example, the environment may be in the form of a separate enclosure 14, within which one entity resides. The entities 12 are assembled together in order to implement a unified aggregate 10. The aggregate 10 provides a service and the aggregate 10 can communicate with a management agent (human or mechanical) as a whole.

The entities 12 are connected to one another via a data path 16. Each of the entities is connected to the data path 16 as shown by connection 18. The data path is implemented as a common medium. Each entity 12 is connected to the data path via connection 18 such that it can excite the medium with a signal which is then received by all of the entities connected to the common medium 16.

The aggregate 10 also includes a mapping path 20 which is implemented as a multitude of point-to-point connections 22. The connections of the entities forms a path with a predetermined topological shape. FIG. 1a depicts a ring topology however the system and method of the invention are not limited to any specific topology.

Signals on the mapping path 20 are independent of signals on the data path 16. The mapping path can be implemented by any means of multiplexing. For example, multiplexing here is used to include separate physical connections (spacial multiplexing) or other multiplexing techniques such as use of different frequency ranges. For example, the different frequency range multiplexing can be implemented by using DC signaling.

The invention provides that some of the entities (base units) include a designating means in the form of hardware (a coordinating processor with memory) and/or software whereby an entity for coordinating communications is designated. Other entities have no designating means. In the embodiment shown in FIG. 9, at least one of the entities (at least one of the network concentrators 40) is a base unit which contains software (S/W) and/or hardware (H/W) capable to monitor and manage the aggregate. The other entities may be either base type units or expansion units which do not contain S/W and/or H/W capable to monitor and manage the aggregate. The hardware may be a commercially available processor for executing the algorithms as described herein. Memory is also preferably provided. However, the designation means may also be provided in a unit (computer) connected to the entity, allowing the use of the processor and memory of the connected computer.

FIG. 1b provides a schematic showing of an entity 12 with CPU 22, memory 23, and ports 24. The ports 24 are connected to users, such as over a known medium including fiber optic cable, coax cable, unshielded/shielded twisted pair etc.. Entities 12 which can be designated the coordinating unit or designating entity are provided with a CPU and software for running the coordinating unit designation and the mapping as described herein.

According to the invention, the aggregate designates one of the entities in the aggregate for coordinating the aggregate. The designation is by use of an algorithm provided for example through software available in each designating means of an entity 12 capable of being designated. The designated entity or coordinating entity coordinates the transfer of all management information relevant to the aggregate. Any of the entities which includes the designating means and also which provides one or more points of access for a management agent, can be the coordinating entity. As used herein, management agent refers to software or software and hardware wherein the management agent is external to the aggregate. For example, such a management agent could be ONdemand® network management software offered by Chipcom Corporation of Southborough Mass. Such software may be installed in a computer which is connected to the aggregate, such as through one or more of the entities 12. The aggregate 10 provides one or more points of access, residing in one or more of the entities which are members of the aggregate 10. Anyone of the entities 12 which is capable of acting as the coordinating entity takes part in the designating process based on the algorithm as mentioned above. One of the entities then becomes the coordinating entity, after the designating process. This coordinating entity provides the point of access to the management agent and maintains an information database which is necessary for management purposes. The information database is compiled by the coordinating entity using its designated status.

The coordinating entity performs its function by sending a message addressed to an entity in the aggregate. A receiving entity which receives a message from the coordinating entity, addressed to that receiving entity, performs all of the operations indicated by the received message and transmits a message containing information relevant to the message received. The coordinating entity is required to address each entity in the aggregate within a specified and agreed upon time period. If an entity in the aggregate does not receive a message from the coordinating entity it will initiate one of the three processes, namely:

Isolate itself, and operate as a stand alone entity independent of the aggregate.

Initiate the algorithm which designates an entity in the aggregate to coordinate the transfer of information (coordinating entity).

Await for the designated entity to issue a message requesting all un-mapped entities to send a message announcing that they are connected to the aggregate.

Referring to FIG. 2, upon power-up, several or all of the entities in the aggregate will execute the top level logical flow paths depicted in FIG. 2. The flow chart describes both the power-up and steady state behavior of the aggregate.

The aggregate 10 is first powered-up as indicated at step 30. After power-up, all entities which are capable of being designated as the coordinating entity compete for managership as noted as step 32. This procedure is described with reference to the logical flow path of FIG. 3.

Figure 3:
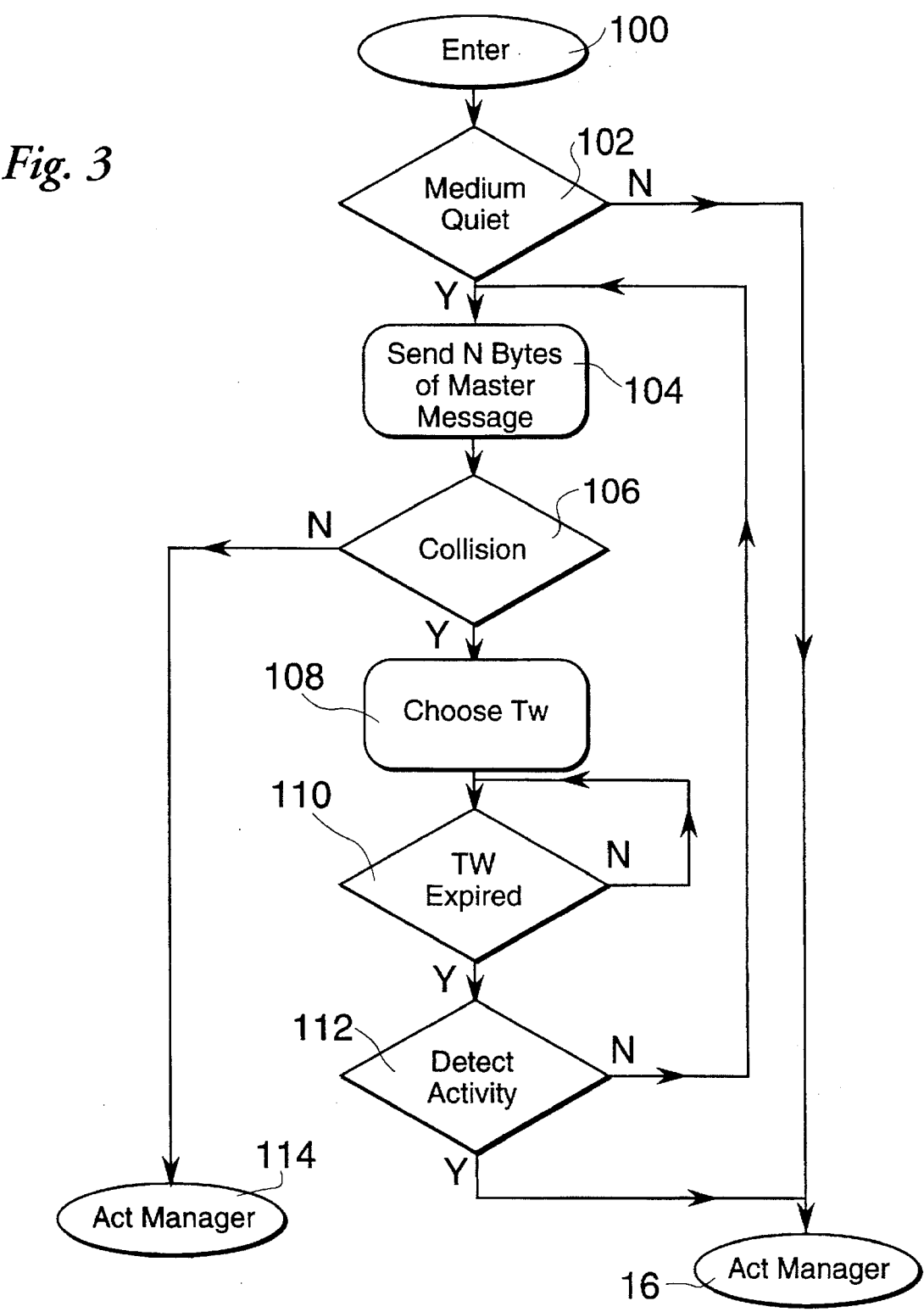
FIG. 3 is a flow chart describing the designation of a communication coordinator.

As shown in FIG. 3, the process of competition for the managership in each entity which can be designated begins by a listening period 102. If the entity does not detect any signals on the data path 16, it will send a message comprising a number of bytes, indicating its identity and the fact that it is the coordinating entity 104. At the end of the transmission period the entity will verify that it received its own message uncorrupted (no collision occurred) as shown at 106. An uncorrupted message is considered to indicate that during the transmission no other entity attempted to transmit a message of its own. A corrupted message indicates collision, that is another entity attempted to transmit a message during the same time. If a collision occurred, the entity will choose a random time period 108, during which it will listen to the data path 16. The entity will wait for the chosen time period 110, and when the chosen time period expires, it will verify if any message was transmitted on the data path 112. If no messages were transmitted on the data path 16, the entity will again transmit its message indicating its identity and the fact that it is the coordinating entity as shown at step 104. If at the expiration of the chosen time the entity detects a received message it will exit the process of competition for the managership as shown at step 116. If the message indicating the entity's identity and the fact that it is the coordinating entity 104 is received without corruption the entity will assume the function of coordinator for the aggregate management as noted at step 114.

Figure 7:
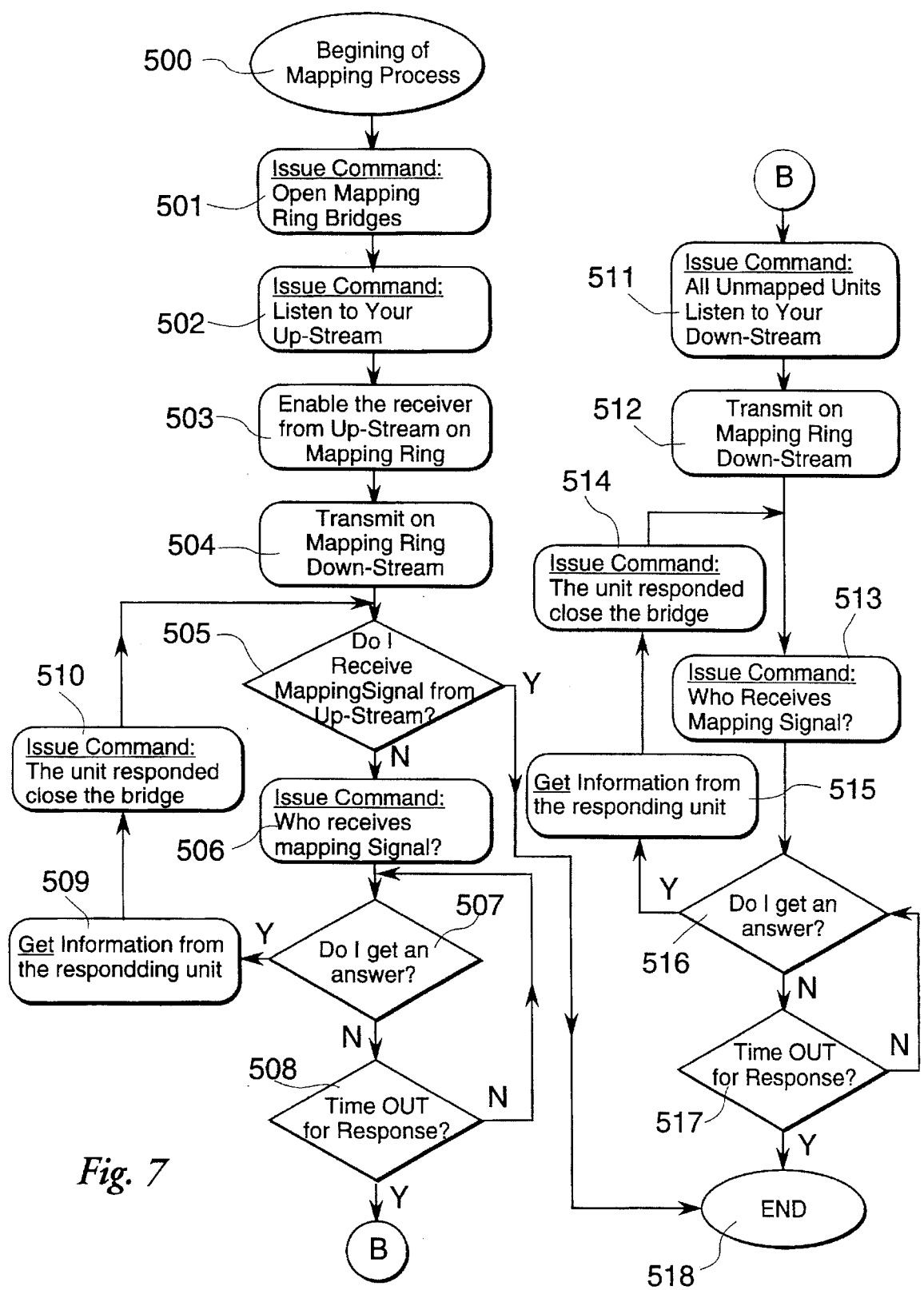

Upon terminating the process depicted in FIG. 3, if the entity is the coordinating entity 114, it will perform a mapping of the aggregate as shown at step 36 on FIG. 2. The mapping process uses the coordinating processor and memory and software following an algorithm as depicted in FIG. 7. The designated entity starts the mapping process 500, by issuing a command 501 to all entities in the stack to open the mapping bridges. By opening the bridge, an entity in the aggregate prevents the mapping signal from propagating along the mapping path 20. The designated entity issues to all entities in the aggregate the command 502 to listen to their upstream connection on the mapping path 20. The upstream direction is arbitrary but must be uniquely defined for all entities capable of connecting into an aggregate. For the purpose of this document upstream will be defined as a signal received by an entity on the mapping path 20 while propagating clockwise. The designated entity enables its own receiver at step 503, listening to the upstream direction. The designated entity begins transmission at step 504 of a mapping signal in the downstream direction and verifies if a mapping signal is received from the upstream 505. If no mapping signal is received from the upstream direction by the designated entity, it sends a broadcast command at 506 requesting identifying information on the entity in the aggregate which receives the mapping signal. In the specific implementation described here the chosen topology of the mapping path 20, is a circle, guaranteeing that at most one entity will be entitled to provide the requested information. The designated entity verifies at step 507 if a response message is received. If no message is received a timer is verified. If the time allocated for awaiting an answer has not expired as noted at step 508, the designated unit continues to wait for the requested information. Upon reception at step 509 of the requested information, the designated entity, logs it in its mapping data-base. Once a unit in the aggregate is recorded in the data base of the designated entity, a command at 510 is issued to it, to close the mapping bridge. In doing so, an entity in the aggregate allows the mapping signal to propagate to the next downstream entity. The designated entity attempts to map the whole aggregate repeating the procedure described at steps 505, 506, 507, 508, 509, and 510. This procedure is terminated in one of the two ways:

The designated entity may receive at step 505 a mapping signal from its upstream neighbor. Since the described mapping topology is a circle, that means that the process has logged all units.

The designated entity may detect at 508 that the waiting time for a response has expired. Such an occurrence is possible if one of the point to point connections along the mapping path 20 is malfunctioning. In such a case the designated entity issues a command at 511 to all as of that time unmapped entities to listen for a mapping signal coming from their downstream neighbor. Then the designated entity transmits a mapping signal at step 512 in the upstream direction, and issues a request at 513 for information identifying the entity in the aggregate which receives the mapping signal. The designated entity verifies if a response message is received at 516. If no message is received a timer is verified. If the time allocated for awaiting an answer has not expired at step 517, the designated unit continues to wait for the requested information. Upon reception of the requested information at 515, the designated entity, logs it in its mapping data-base. Once a unit in the aggregate is recorded in the data base of the designated entity, a command is issued to it, to close the mapping bridge 510. In doing so, an entity in the aggregate allows the mapping signal to propagate to the next upstream entity. The designated entity attempts to map the whole aggregate repeating the procedure described in 513, 514, 515, and 517. This procedure continues until the wait time verified in 517 expires without a response from an entity in the aggregate.

Figure 5:
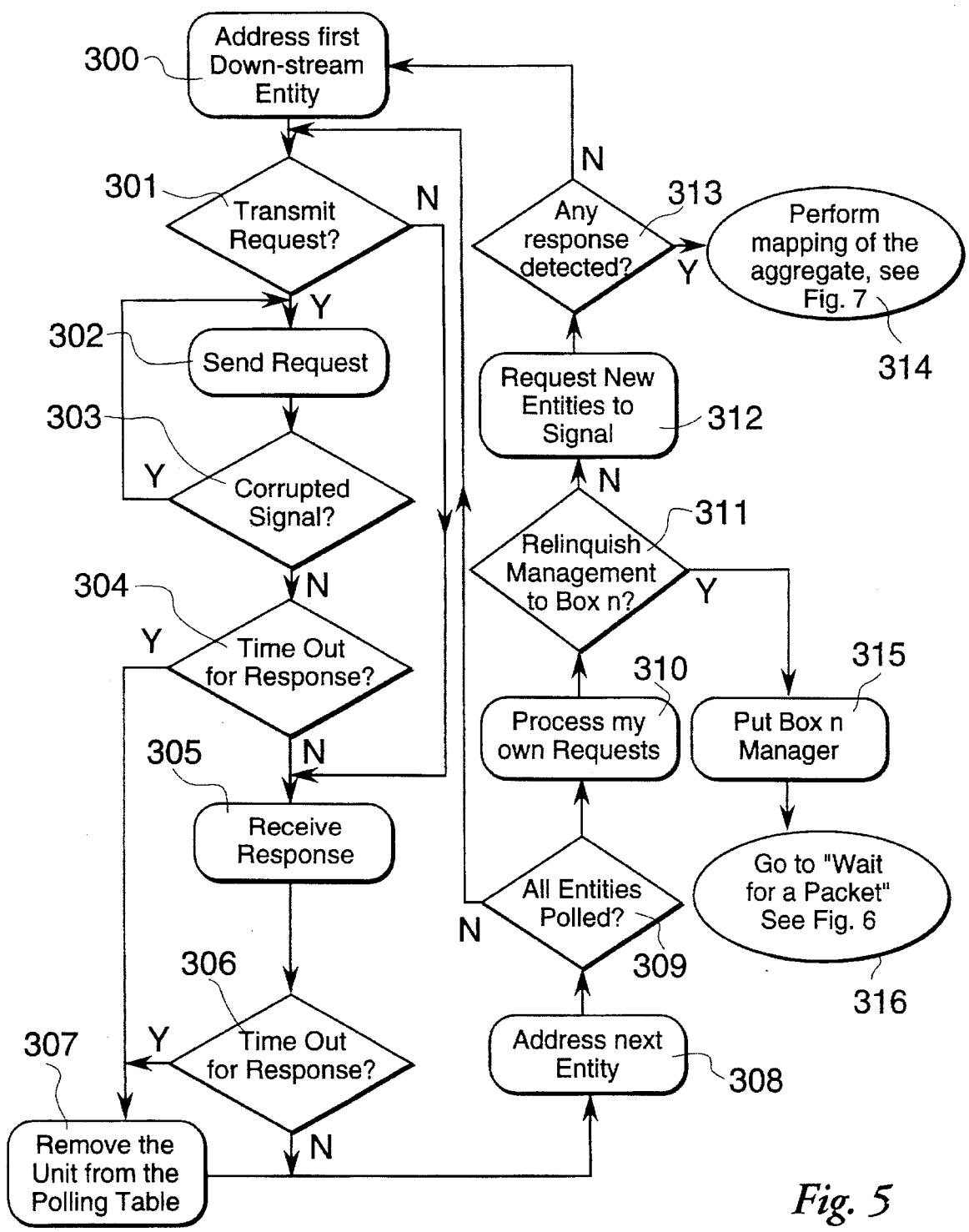
FIG. 5 is a logical flow chart for an active manager.

Following the completion of the aggregate mapping, the designated entity verifies if it is expected to act as the active manager at step 37 (FIG. 2). If the result of the verification is yes, the designated entity enters the active manager program 38 in FIG. 2. The detailed program for the active manager is described with reference to FIG. 5.

The activity of the active manager (of the coordinating entity) is a continuous cycle which poles the units in the aggregate, and takes place on the data path 16, only. The cycle arbitrarily starts by addressing the first downstream entity at step 300. If the sent message was a request 301 for an action or for obtaining information, the active manager adds the request content 302 and verifies that the message has been received by itself corrupted 303. If the message was not received by the active manager, it is transmitted again. If the transmitted message is not corrupted, the active manager waits for a period of time as noted at step 304, to receive the requested answer at 305. If the waiting time at 306 expires without a response from the addressed entity, the entity which did not respond is removed from the mapping data base at 307. If a response is received on time as per step 306 the information is recorded and the next entity in the aggregate is addressed at 308. If not all entities in the aggregate are addressed, at step 309, the process continues to 301 and repeats. If all units in the aggregates have been addressed at step 309, the active manager addresses its own request for an action or for obtaining information 310. A possible request for the active manager is to relinquish the managementship to another entity in the aggregate as noted at step 311. If such a request has not been placed the active manager, places a broadcast message requesting from all unmapped entities in the aggregate to announce their presence 312. If any response at all is received 313, the active manager performs the aggregate mapping procedure as described in FIG. 7.

Figure 6:
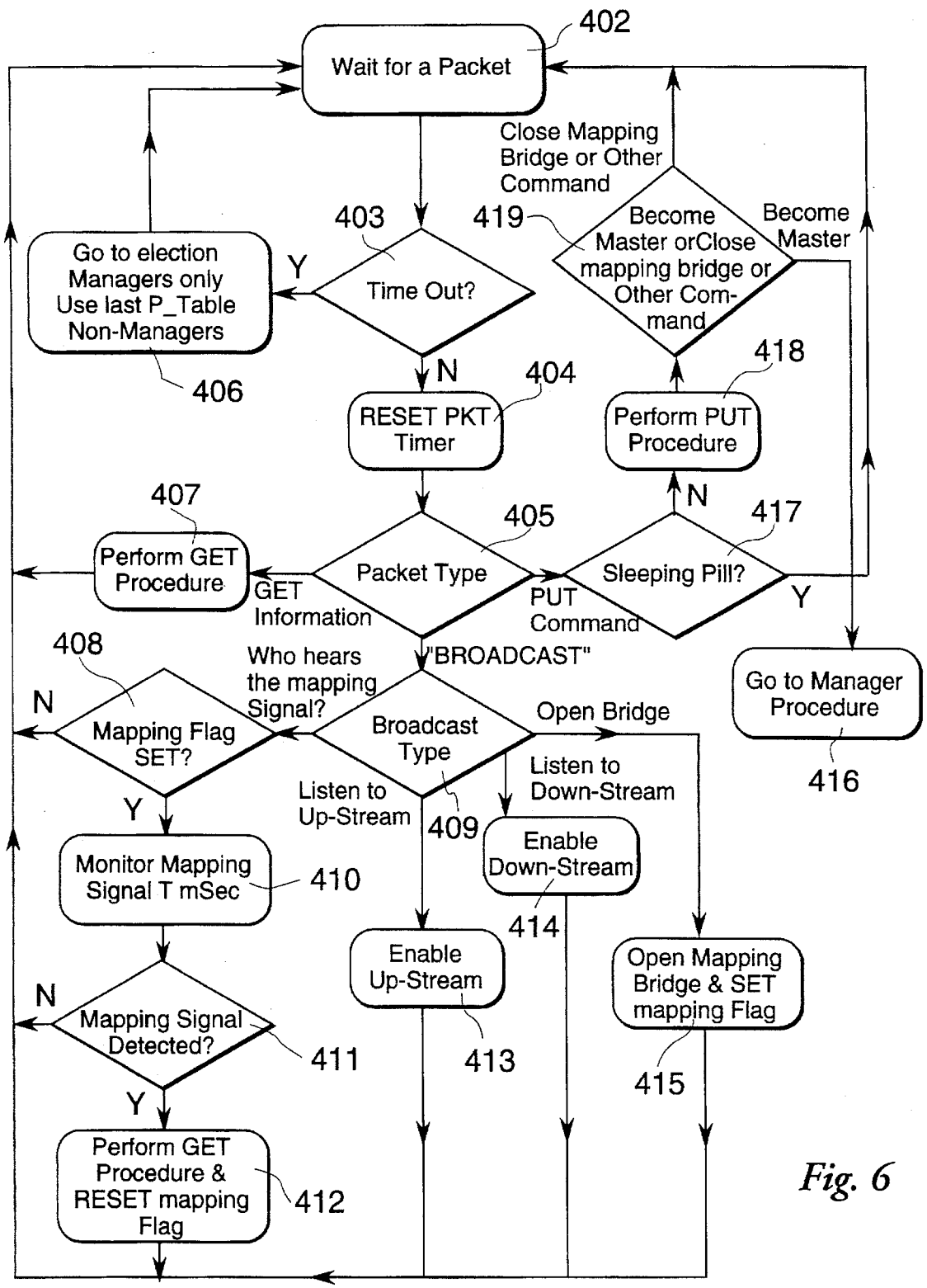
FIGS. 6 and 7 are logical flow charts describing the process of mapping the aggregate based on a preferred topology wherein entities are connected in a circle as shown in FIG. 1.

The actions performed by an entity which is not a designated entity are described in FIG. 6. The cycle of activities for a non designated entity begins by waiting for a message (packet) addressed to it as noted at 402. The entity waits for a specified and agreed upon period of time at 403. If the said time expires and no message has been received (either addressed to the entity in discussion or not) the entity will attempt one of the following two actions:

1. If the entity can become a designated entity it will try to establish itself as the designated entity at 406.

2. If the entity cannot become designated it will revert to the last settings recorded in its P_Table (i.e. Parameters Table). (For added detail see also FIG. 4.)

If any message is received the waiting lime is reset at 404. The received packed is analyzed at 405. The following cases exist:

A "Get" request is received. The unit is requested by the designated entity to provide information. The entity supplies the information at 407.

A "Put" command is received. The command may be a "Sleeping Pill" as per step 417 that is an acknowledgement from the designated entity that the non-designated entity in discussion is recorded in the mapping table. If no "Put" command is received during the polling cycle the any unit will assume that it was removed from the mapping table.

If the received "Put" command is not a "Sleeping Pill" as at 417, the "Put" procedure is performed at 418. Upon completion of the "Put" procedure the non-designated entity returns to step 402. One exception is possible, if the non-designated unit is required to assume the functionality of a designated or coordinating unit at 416.

The packet type (message type) as sorted in step 409 can be a "Broadcast":

"Open Bridges"—the entity opens the mapping bridges at 415.

"Listen Down-Stream" as per step 414. The entity enables the Downstream receiver on the mapping path 20.

"Listen Up-Stream" as per step 413. The entity enables the Upstream receiver on the mapping path 20.

"Who hears the mapping Signal?". If the mapping flag is set at 408, that is the entity is expecting to be mapped, it monitors the mapping signal expected from the set direction for a set period of time at 410. If during the set period of time the mapping signal is detected at 411 the entity will provide the information identifying itself following a "Get" procedure at 412 and return to the beginning of the cycle at step 402. If no mapping signal is detected during the set period of time at step 411 the entity returns to the beginning of the cycle without performing the "Get" procedure.

In the context of this invention it is assumed that entities in the aggregate may be of such a type that they cannot become designated. Such entities will default to non-designated status following the power up. In the case that such units detect the absence of any designated entity in the aggregate they follow the procedure 200 as described in FIG. 4.

Figure 4:
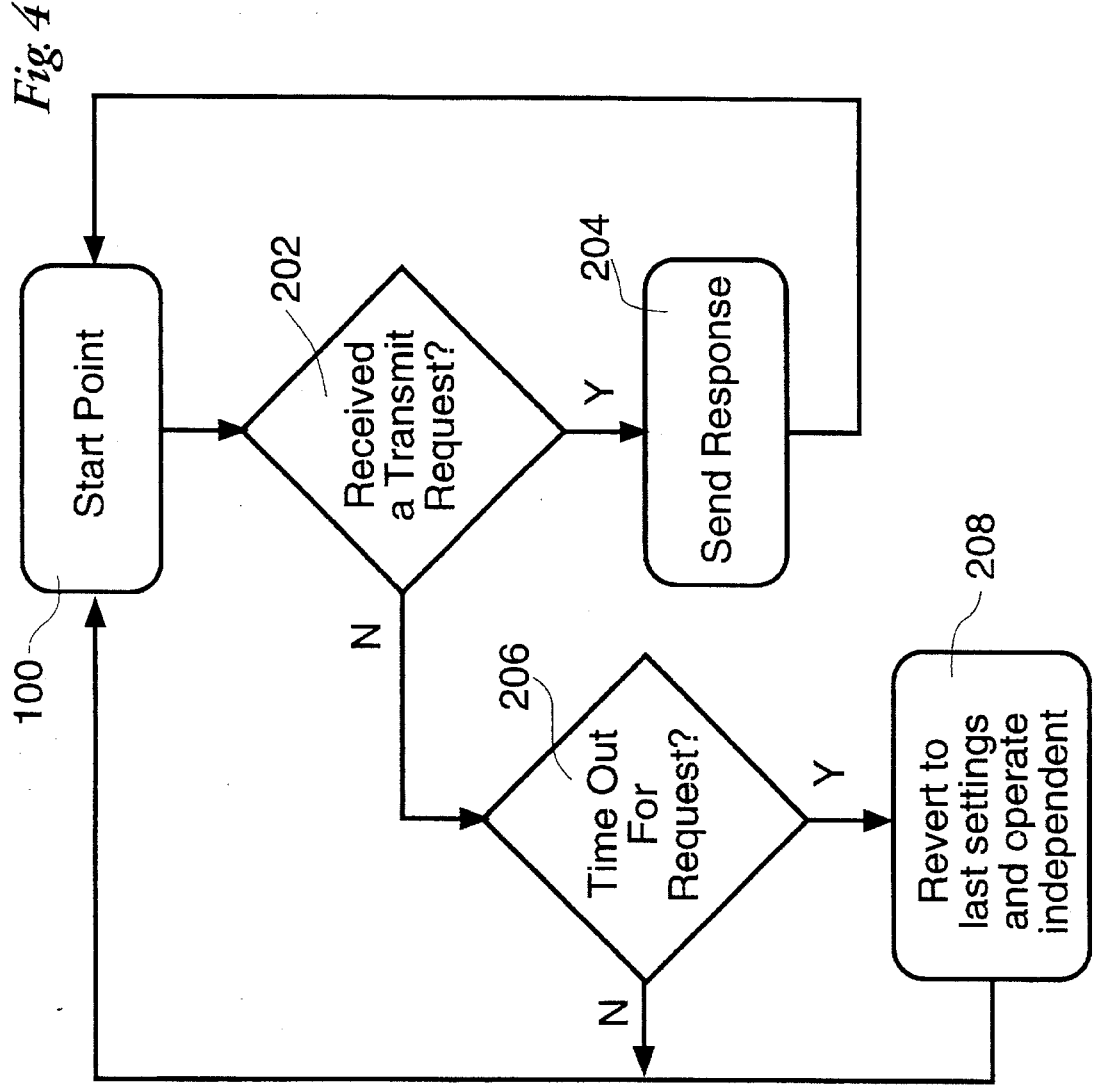
FIG. 4 is a logical flow chart for a non-manager entity.

FIG. 4 depicts the logical flow chart for a non-managing entity. Specifically, for entities which are not connected to a management agent (and/or do not include a coordinating processor and memory), after the starting point 100 the entity in a manner described with regard to FIG. 3 checks if it has received a transmit request at step 202. If a request has been received, a response is sent as noted at step 204. However, if no request has been received, a time out is taken as noted at step 206. As noted above with regard to the responsibilities of the entity designated as the coordinating entity, the designated entity is required to address each entity in the aggregate within a specified and agreed upon time period. As noted at step 208, the entity will revert to the last settings and operate independently if they cannot act as a coordinating entity and if no coordinating entity has been designated.

Figure 8:
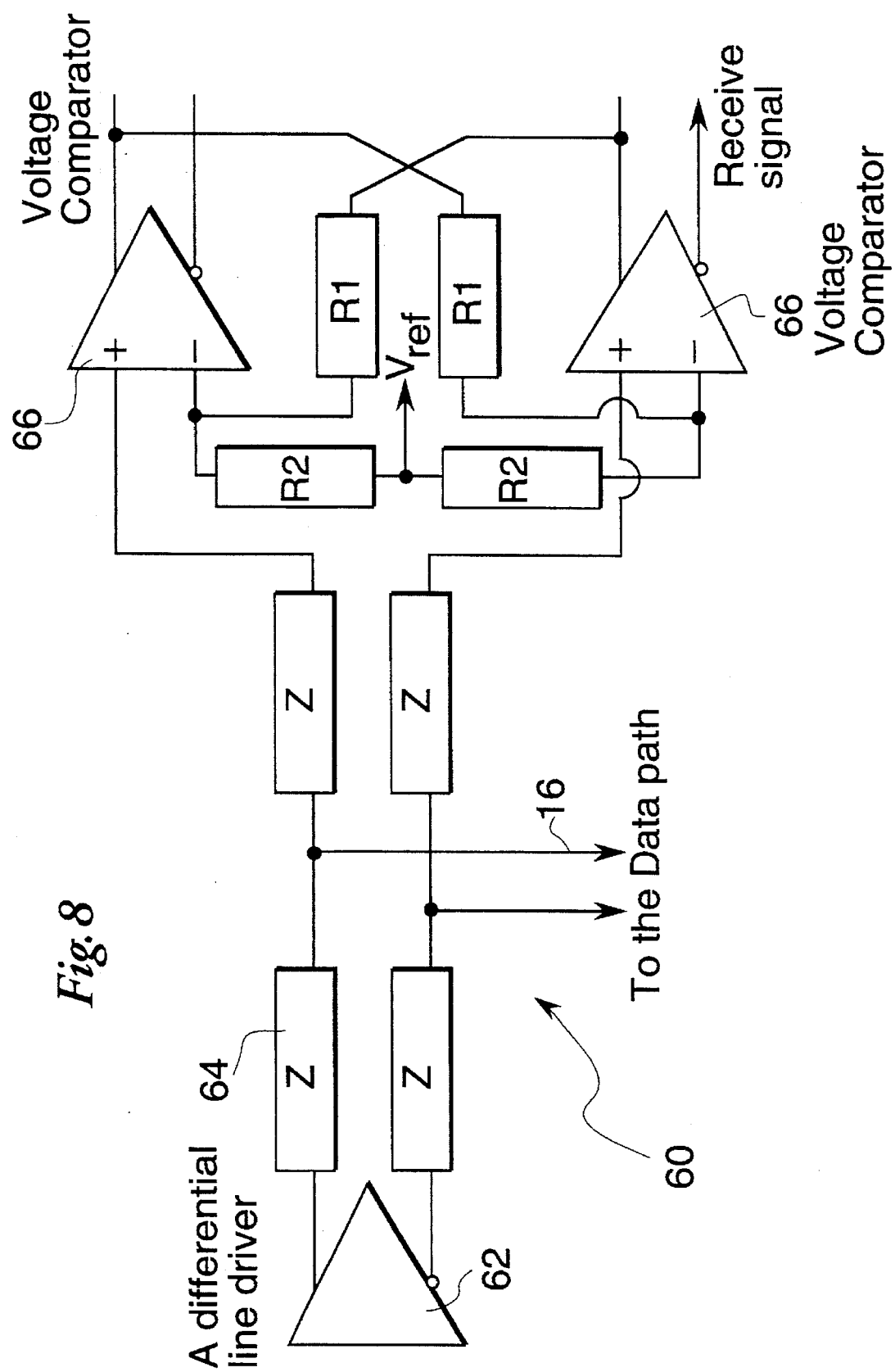
FIG. 8 is a circuit diagram showing a collision mechanism which is implemented on the data path.

FIG. 8 shows the concepts of a collision means 60 for detecting collisions. The collision detection is used by the coordinating processor, particularly the designation means of entities which can act as coordinating entity. The collision means 60 is implemented on the data path 16 and can be used to detect the transmission of an identifying message by several entities which have the capability to be designated as communications coordinator (as discussed above).

The signals to the data path are driven by a differential line driver 62 through a complex impedance "Z" (64). The impedance "Z" can be for example a 50 Ohm resistor in series with a 0.1 µF capacitor, or the equivalent circuit of a transformer. The two voltage comparitors 66 are connected to implement a set reset flip-flop. The switching threshold for the set-reset flip-flop is determined by the output voltage levels, the values of the resistors R1 and R2 and the $V_{ref}$. The switching threshold of the implemented set-reset flip-flop is set to half the voltage of the transmitted signal into the data path. For example such settings may be:

Transmitted signal: 5.0 V±0.5 V differential
Received signal: 2.5 V Minimum.

The data rate of the transmitted signals is such that the maximal size of the data path is significantly smaller than the electrical length of one transmitted bit. Upon simultaneous transmission of signals from two entities which have the capability of being designated as the communications coordinator, due to the fact that each message has a unique content at least some of the time the signals will be of opposite polarity. Those signals will set on the medium of the data path 16 a voltage level which cannot flip to the receive circuit. Each entity (base unit) which has the capability to be designated as the communications coordinator compares the transmitted message with the received message, and if the two are not identical it is assumed that a collision occurred. When not transmitting, the differential line driver 62 sets its output to high impedance.

Figure 9:
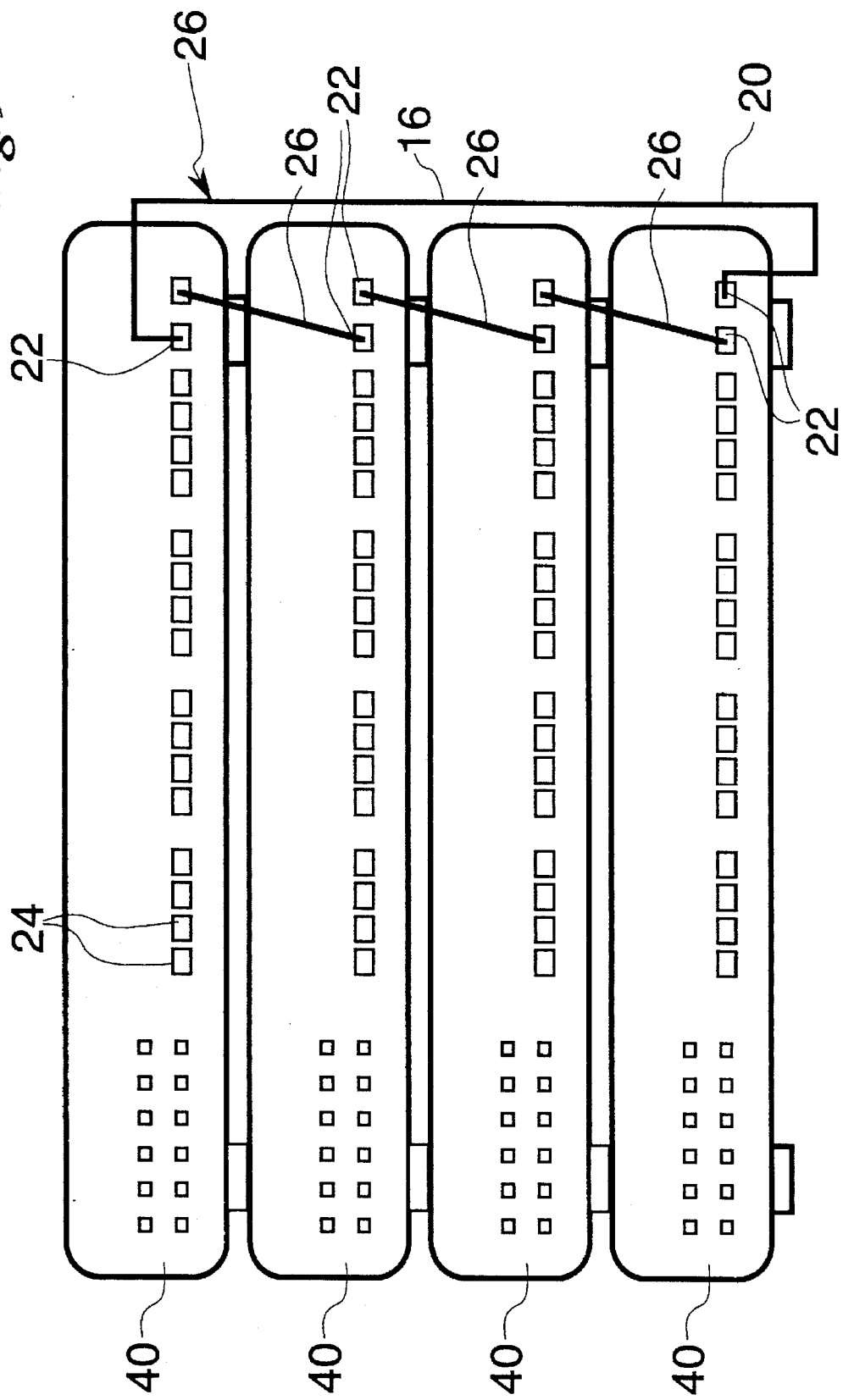
FIG. 9 is a front view showing an embodiment of the invention based on entities which are concentrators connected by patch cables.

FIG. 9 depicts an embodiment of the invention wherein a plurality of entities 12 are provided in the form of stackable hubs (concentrators) 40. Each concentrator 40 has a plurality of ports 24. Some of the concentrators (at least one) are entities which can be designated as coordinator. These base unit(s) may be connected to a management agent and include a coordinating processor and memory. Each of the ports 24 may be connected to a user such as a computer which is to be connected to a network via the concentrator. The concentrators are connected via a medium 26 by point-to-point connection 22 in order to provide the mapping path 20. Additionally, the concentrators are connected via the medium 26 to provide the data path 16. Different wires may be used for the paths (spatial multiplexing) preferred or the paths may be formed on common wires (or optical guides). The cables 26 connecting the entities (boxes 40 in FIG. 9) contain appropriate elements to implement the mapping path. In the implementation given as an example, one pair of twisted wires is used for point-to-point connections between the boxes 40. A second and different pair of twisted wires implements the data path. After connection of the data path and the mapping path as shown in FIG. 9, a communications coordinator is designated as described herein. After such designation of a communications coordinator, mapping is performed and subsequently communication on the data path and communication on the mapping path proceeds.

Figure 10:
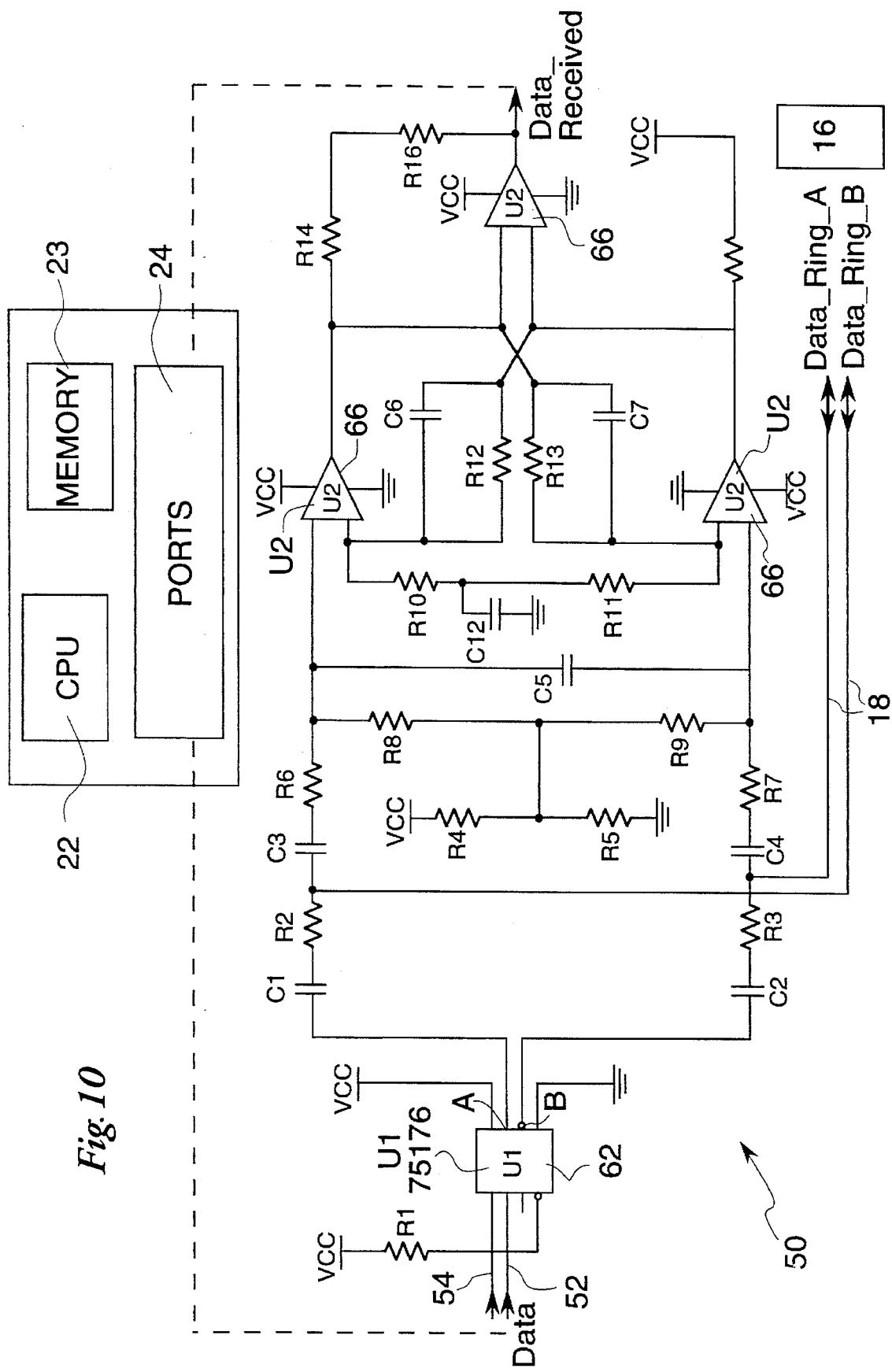
FIG. 10 is a circuit diagram of the transmit/receive circuitry for the data path of the system of the invention.

Referring to FIG. 10, the preferred form of the invention includes data path transmit and receive circuitry generally designated 50. This circuitry includes the collision detect means 60 as well as line driver 62 U1 (RS 485). Signals which are to be transmitted over the data path 16 are generated in a TTL (transistor-transistor-logic) format and presented to the transmit/receive circuitry 50 at the data input 52. Data Ring A and Data Ring B are the two pins which attach to the data wires 16. While transmitting signals on the data path 16, the output pins of the processor U1 (75176) are activated by the data__en input 54. If no signal is to be transmitted on the data path 16, the output pins A and B of chip U1 are set to present a high impedance. The signals to be transmitted propagate differentially from pins A and B of U1 through two identical impedances implemented by C1 (0.1 µF) and R6 (51.1 Ω) to pin 9 on U2 and through C4 (0.1 µF) and R7 (51.1 Ω) to pin 5 on U2. U2 is a package containing four comparators 66 commercially named LM339. Two of the comparators 66 are connected to implement a SET/RESET FLIP/FLOP. That is achieved by the connection of R12 (18 kΩ) between the output at pin 2 on U2 and the input at pin 8 on U2, and R13 (18 kΩ) between the output at pin 14 on U2 and the input at pin 4 on U2. Two additional resistors R10 and R11 (both 3.9 kΩ) are serially connected between the inputs at pins 8 and 4 on U2 in order to set the switching threshold for the implemented SET/RESET FLIP/FLOP. A capacitor C12 (0.1 µF) connects to GND the point between R10 and R11 for filtering purposes. The received signal (DATA__Received) is presented to other functions inside each entity enclosure in TTL levels through a third comparator 66 in U2 at output 13.

Figure 11:
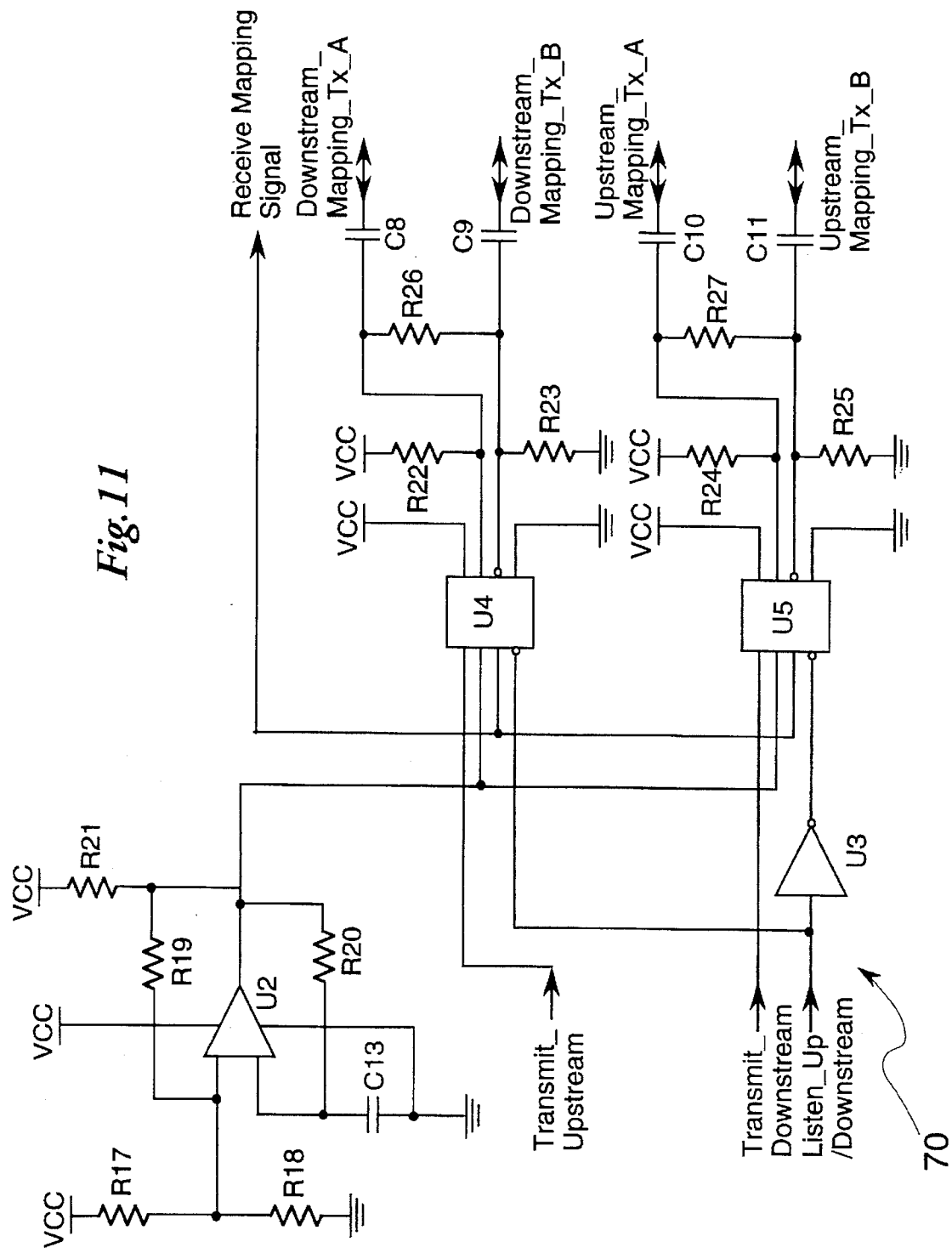
FIG. 11 is a circuit diagram of the mapping signal generation and detection circuitry of the system according to the invention.

FIG. 11 shows a mapping signal generation and detection circuit generally designated 70. The signals on the mapping path 20 are generated and detected by two components U4 and U5 (both 75176 transmit/receive elements). The mapping signal is generated by a circuit implemented around one of the four comparators contained in U1. A hysteresis is created by R19 (47 KΩ), R17 (47 KΩ) and R18 (47 kΩ). A negative feed-back through R20 (47 KΩ) between pins 1 and 6 on U2 and C13 (1500 pF) establishes an oscillation frequency of 10 kHz±5%. The signal is permanently attached to both components U4 and U5 at pins DIN. In order to select which component will actually send the signal the following controls will be set Listen__Up/DownStream. This signal is presented to U4 and U5 in opposite polarities. Therefore when U4 is in receive mode U5 will be in transmit mode and conversely when U5 is in receive mode U4 will be in transmit mode.

Transmit__UpStream. This signal sets the output impedance of U4 to low values and enables the transmission drivers to propagate the signal on the mapping path 20.

Transmit__DownStream. This signal sets the output impedance of U5 to low values and enables the transmission drivers to propagate the signal to the mapping path 20.

Resistors R22 (3.3 kΩ), R23 (3.3 kΩ), R24 (3.3 kΩ), R25 (3.3 kΩ) in conjunction with R26 (220 kΩ), and R27 (220 kΩ), set a convenient bias on the inputs in order to prevent triggering of the circuit by noise.

While a specific embodiment of the invention has been shown and described in detail to illustrate the application of the principles of the invention, it will be understood that the invention may be embodied otherwise without departing from such principles.

What is claimed is:

1. A system for communication and management of an aggregate based on separate entities, comprising:
   a plurality of separate entities, each entity residing in a separate environment and having no predefined address for the purpose of communication between said separate entities of said aggregate;

a data and management path provided as a common medium, each of said entities being connected to said data and management path for exciting the medium with a signal, all entities connected to said common medium receiving said signal allowing communication between said separate entities including the transfer of data packets between said separate entities and the transfer of management data of the aggregate including data for changing and setting operating parameters of the aggregate and the transfer of data for assigning a unique identifier to the separate entities for acquiring statistical data;

a mapping path implemented as a multitude of point to point connections such that each entity is connected to an adjacent entity via a point-to-point connection and is connected to another adjacent entity via a point-to-point connection providing a predefined topology, said mapping path for passing mapping signals between adjacent entities for locating entities in the aggregate including locating each entity with respect to said predefined topology;

a management agent connected to said aggregate via one or more active points of access residing in one or more of said entities, said management agent including a mapping table, said management agent for initiating identification via said mapping path including receiving a message from all unmapped entities and establishing a mapping address for each entity based on said message and sending data assigning said unique identifier and for mediating the transmission of commands including changing and setting operating parameters of the aggregate, wherein one or more of said entities are capable of providing a point of access to said management agent; and designation means for participating in a process for designating a coordinating entity, each of said one or more of said entities including designation means, said coordinating entity providing said point of access to said management agent for managing and coordinating communications over said data path, wherein said designation means listens to said data path medium for a predetermined period of time for detection of communication signals, upon detecting communication signals said designation means of said entity awaits issuance of a message, by said coordinating entity, requesting all un-mapped entities to signal their presence, if no communication signalling is detected on said data path, said designation means initiates an algorithm including transmitting a signal containing unique information identifying itself, if during transmission of said unique information identifying itself additional entities transmit their unique information identifying themselves, said designation means of each of said entities will end their transmission and randomly choose a time period, upon expiration of said randomly chosen time period, said designation means of each entity will attempt to transmit again its unique information identifying itself, upon the occurrence of transmission of said unique information identifying itself, said designating means which completed said transmission is established as the coordinating entity.

2. A system according to claim 1, wherein said management agent maintains statistics regarding communication over said data and management path based on the stored information.

3. A system according to claim 1, wherein said coordinating entity is connected to said management agent.

4. A system according to claim 3, wherein said coordinating entity coordinates all communications on said data path including sending a message addressed to an entity in said aggregate, whereby the entity after receiving said message from said coordinating entity performs necessary operations and transmits a message containing information relevant to the received message, said coordinating entity addressing each entity in said aggregate within a specified and agreed upon time period.

5. A system according to claim 4, wherein each designating means of each entity, upon listening to said data path medium for a predetermined period of time and not detecting any communication signals;

isolates itself whereby said entity operates as a stand alone entity independent of said aggregate;

initiates said algorithm for designating an entity in the aggregate to coordinate the transfer of information; or awaits for the coordinating entity to issue a message requesting all un-mapped entities to send a message announcing that they are connected to the aggregate.

6. A system according to claim 1, wherein said mapping path is independent of said data path, allowing two entities in said aggregate to communicate simultaneously along said data path and along said mapping path.

7. A system according to claim 6, wherein said predefined topology of said mapping path is a ring, with point-to-point contact between adjacent entities.

8. A system according to claim 6, wherein said mapping path is provided on said common medium, implemented by multiplexing data/management signals and mapping signals.

9. A system according to claim 8, wherein said multiplexing is one of spacial multiplexing or multiplexing based on different frequency ranges.

10. A method for communication and management of an aggregate based on separate entities, comprising:

providing a plurality of separate entities, each entity residing in a separate environment and each entity having no predefined address;

providing a data and management path as a common medium;

connecting said entities to said data and management path;

exciting the medium with a signal, for communication, wherein all entities connected to said common medium receive said signal;

providing a mapping path implemented as a multitude of point to point connections such that each entity is connected to an entity via a point-to-point connection and each entity is connected to another entity via a point-to-point connection to form a known topology;

identifying all entities adjacent to a given entity using said mapping path to establish mapped adjacent entities and from said mapped adjacent entities establishing a unique identifier for each of said entities adjacent to said mapped adjacent entities until all entities of the aggregate are mapped and saving said unique identifier;

providing a management agent;

connecting said management agent to said aggregate via one or more active points of access residing in one or more of said entities; and for initiating identification via said mapping path and storing information relating to said identification for managing access to said data/management path, and maintaining statistics regarding communication over said data/management path based on the identification saved;

providing one or more of said entities with the capability of providing a point of access to said management agent, providing said one or more entities with designation means for participating in a process for designating a coordinating entity, said coordinating entity providing said point of access to said management agent;

listening to said data path medium for a predetermined period of time for detection of communication signals;

upon detecting communication signals awaiting issuance of a message, by said coordinating entity, requesting all un-mapped entities to signal their presence;

if no communication signalling is detected on said data path, initiating an algorithm including transmitting a signal containing unique information identifying an entity;

if during transmission of said unique information identifying an entity additional entities transmit their unique information identifying themselves, ending their transmission and randomly choosing a time period;

upon expiration of said randomly chosen time period, attempting to transmit again the unique information identifying the entity; and upon the occurrence of transmission of said unique information identifying the entity establishing the entity as coordinating entity.

11. A method according to claim 10, further comprising coordinating all communications on said data path with said coordinating entity including sending a message addressed to an entity in said aggregate, whereby the entity after receiving said message from said coordinating entity performs necessary operations and transmits a message containing information relevant to the received message, said coordinating entity addressing each entity in said aggregate within a specified and agreed upon time period.

12. A method according to claim 11, wherein each designating means of each entity, upon listening to said data path medium for a predetermined period of time and not detecting any communication signals;

isolates itself whereby said entity operates as a stand alone entity independent of said aggregate;

initiates said algorithm for designating an entity in the aggregate to coordinate the transfer of information; or awaits for the coordinating entity to issue a message requesting all un-mapped entities to send a message announcing that they are connected to the aggregate.

13. A system for communication and management of an aggregate based on separate entities, comprising:

a plurality of separate entities, each entity residing in a separate environment and having neither a predefined identity nor a predefined address;

a data and management path provided as a common medium, each of said entities being connected to said data path for exciting the medium with a signal, all entities connected to said common medium receiving said signal allowing communication between said separate entities including the transfer of data packets between said separate entities and the management of the aggregate including changing and setting operating parameters of the aggregate;

a mapping path implemented as a multitude of point to point connections such that each entity is connected to an adjacent entity via a point-to-point connection and is connected to another adjacent entity via a point-to-point connection; and a management agent connected to said aggregate via one or more active points of access residing in one or more of said entities, said management agent for controlling mapping signals over said mapping path to determine the existence of each unit and identify the position of each unit relative to the aggregate for providing a unique identifier to each of the separate entities, based on a known topology and saving said unique identifier in a mapping table, wherein said managing agent uses a distributed algorithm means for implementing an algorithm for mapping the entities, each of said entities including a mapping bridge, which, according to settings of said mapping bridge, propagates said mapping signal from a precursor entity to a succeeding entity, upon propagating said signal, said algorithm means assigning said succeeding entity a unique identifier, if said succeeding entity has not been assigned a unique identifier, said algorithm means repeatedly implementing said algorithm until all available paths of a predefined topology receive said mapping signal.

14. A system according to claim 13, wherein said managing agent uses a distributed algorithm means for implementing an algorithm for mapping the entities, each of said entities including a mapping bridge which, according to settings of said mapping bridge, propagates said mapping signal from a precursor entity to a succeeding entity, upon propagating said signal, said algorithm means assigning said succeeding entity a unique identifier, if said succeeding entity has not been assigned a unique identifier, said algorithm means repeatedly implementing said algorithm until all available paths of a predefined topology receive said mapping signal.

15. A system according to claim 13, wherein said management agent checks all paths of said predefined topology for a return of said mapping signal for stopping implementation of said algorithm and if said predefined topology does not allow a return of said mapping signal to said managing agent, said mapping agent sets all mapping bridges along all available paths until a set time has passed indicating said mapping path is not able to return said mapping signal to said management agent.

16. A method for communication and management of an aggregate based on separate entities, comprising:

providing a plurality of separate entities, each entity residing in a separate environment and each entity having no predefined address;

providing a data and management path as a common medium;

connecting said entities to said data and management path;

exciting the medium with a signal, for communication, wherein all entities connected to said common medium receive said signal;

providing a mapping path implemented as a multitude of point to point connections such that each entity is connected to an entity via a point-to-point connection and each entity is connected to another entity via a point-to-point connection to form a known topology;

identifying all entities adjacent to a given entity using said mapping path to establish mapped adjacent entities and from said mapped adjacent entities establishing a unique identifier for each of said entities adjacent to said mapped adjacent entities until all entities of the aggregate are mapped and saving said unique identifier;

providing a managing agent; and using a distributed algorithm means by the managing agent for mapping the entities, each of said entities including a mapping bridge for opening one or more of said point-to-point connections, said distributed algorithm for:

designating one of said point-to-point connections of each entity as an upstream connection, opening said mapping bridge to prevent a mapping signal from propagating along the mapping path, listen to an upstream connection on the mapping path, and transmitting a mapping signal in a downstream direction, opposite said upstream direction, waiting for a mapping signal from the upstream direction and if no signal is received, requesting identifying information as to the entity in the aggregate which has received the mapping signal and upon reception of identifying information, saving information in a mapping database to establish said unique identifier.

* * * * *